United States Patent [19]

McDiarmid

[11] Patent Number: 4,528,770
[45] Date of Patent: Jul. 16, 1985

[54] ARTIFICIAL FISHING LURE WITH WEEDLESS ACTUATING HOOKS

[76] Inventor: John C. McDiarmid, 706 E. Donaldson Ave., Raeford, N.C. 28376

[21] Appl. No.: 488,430

[22] Filed: Apr. 25, 1983

[51] Int. Cl.³ .............................................. A01K 85/00
[52] U.S. Cl. ............................. 43/35; 43/42.4; 43/42.53; 264/46.6
[58] Field of Search ............... 43/35, 42, 42.4, 34, 43/36, 42.53; 264/46.6

[56] References Cited

U.S. PATENT DOCUMENTS

| | | | |
|---|---|---|---|
| 2,396,366 | 3/1946 | Forbess | 43/36 |
| 2,474,383 | 6/1949 | Suhr | 43/37 |
| 2,485,728 | 10/1949 | Gardner | 43/36 |
| 2,593,476 | 4/1952 | Nelson | 43/35 |
| 3,411,233 | 11/1968 | Hopper | 43/35 |
| 4,024,668 | 5/1977 | McDiarmit | 43/35 |
| 4,437,257 | 3/1984 | Kluge | 43/42.53 |

*Primary Examiner*—Gene P. Crosby
*Attorney, Agent, or Firm*—Mills & Coats

[57] ABSTRACT

An artificial fishing lure which includes a pair of hooks normally disposed within a retracted position within the lure's body and movable therefrom to a position outwardly of the lure's body in response to a predetermined amount of tension being applied to a fishing line leading from the lure. For actuating said hooks, the present lure provides a flexible molded plastic bow assembly set within said lure's body and operatively interconnected between said fishing line and said hooks.

4 Claims, 6 Drawing Figures

ARTIFICIAL FISHING LURE WITH WEEDLESS ACTUATING HOOKS

FIELD OF INVENTION

The present invention relates to artificial fishing lures and more particularly to the weedless type, and still more particularly to the type wherein one or more hooks are normally disposed within the interior of the lure's body and operative upon actuation to move therefrom to a position outwardly of the lure's body.

BACKGROUND OF INVENTION

Attempts at providing weedless fishing lures have frequently been tried. Many such design attempts have been directed to worm and spoon type lures. Although various designs have been put forth, one of the most common approaches has entailed extending a flexible wire-like member from the body of the lure to engagement with the hooks. The wire-like member acts to shed grass, small limbs and other debris within the water, but is designed to be easily overcome by the force of a fish bite such that the hook is operative to engage and hook the fish during this act.

Applicant, as disclosed in prior U.S. Pat. No. 4,024,668, devised a body type fishing lure with retractable hooks that moved from a retracted position to an exposed position in response to a predetermined amount of tension being applied to the fishing line such as would occur when a fish would grasp the lure as the same was moved through the water. While this basic design was functional and operable, the mechanism designed and provided for actuating the hooks has some disadvantages when considered in a production context. For example, the mechanism disclosed includes many moving parts that required assemblage. In addition the design was such that most of these parts required special tooling. In the end, the mechanism involved was relatively expensive and had the potential for being difficult to maintain.

In addition it has been discovered that providing a plastic fishing lure with an open interior cavity presents a flotation problem. The presence of a cavity in a plastic type lure gives rise to the lure having a tendency to sink and accordingly presents a serious problem where it is desirable to provide a top water or medium-depth fishing lure.

Therefore, there is a need for a weedless fishing lure of the movable hook type that includes an actuating mechanism that overcomes the disadvantages of a mechanism of the type shown and disclosed in U.S. Pat. No. 4,024,668. In addition there is a need to provide an artificial fishing lure of the weedless type and which includes an open cavity therein that will easily float as the same is moved through the water.

SUMMARY AND OBJECTS OF INVENTION

The present invention presents an artificial fishing lure with retractable weedless hooks that is provided with a simple molded plastic hook actuator assembly. In addition the present invention presents an artificial fishing lure that does include an open cavity but which is designed to float and maintain a high level of buoyancy.

In particular, the artificial fishing lure of the present invention includes a molded plastic bow assembly that is flexible and resilient. The bow assembly includes a pair of bow arms, each bow arm having means to engage a respective hook. An arrow associated with the bow assembly is connected to a fishing line and is also connected to a string that is interconnected between said bow arms. As the fishing line is tensioned, the pulling action of the arrow pulls the string and causes said bow arms to be moved inwardly toward each other causing the hooks to be moved from a retracted to an exposed position. Once the tension has been released from the fishing line, the flexibility and resiliency of the bow arms causes the fishing hooks to be moved back to their retracted position.

To provide the artificial fishing lure of the present invention with buoyancy, the body structure thereof is provided with a porous plastic inner body core. The porous inner body core is provided inwardly of a relatively hard plastic shell. To form the porous inner body core, a blowing agent is mixed with a conventional plastic composition to give the porous density inner body core.

It is, therefore, an object of the present invention to provide a weedless fishing lure of the type having retractable hooks with a simple molded plastic hook actuating assembly.

A further object of the present invention resides in the provision of a weedless fishing lure of the character referred to hereinabove, wherein the hook actuating assembly is flexible and resilient in order that the same may function without requiring springs and the like.

Still a further object of the present invention resides in the provision of an artificial fishing lure of the type having retractable hooks wherein the same is manufactured throughout of plastic materials so as to prevent rusting.

Another object of the present invention resides in the provision of an artificial fishing lure of the type having retractable hooks wherein the hook actuating assembly is easy to manufacture and assemble.

More particularly, another object of the present invention resides in the provision of an artificial fishing lure of the type having retractable hooks wherein said hook actuating assembly is in the form of a molded plastic bow assembly that includes a pair of flexible bow arms that engage a pair of hooks and which acts upon actuation to pivot said hooks about a common axis such that they cross and extend out from opposite sides of the fishing lure in exposed hooking positions.

A further object of the present invention resides in the provision of an artificial fishing lure of the character referred to above that is long lasting, easy to maintain, and which is relatively inexpensive.

A further object of the present invention resides in the provision of an artificial fishing lure of the character referred to above which includes hooks normally disposed within a retracted position interiorly of the lure and which are operative to move therefrom to an exposed hooking position, and wherein said lure includes an open cavity for housing said hooks and the actuating mechanism therefor but which is buoyant and will float through the water as the same is pulled therethrough.

Another object of the present invention resides in the provision of an artificial lure of the character referred to above that includes a generally solid cross sectional body area comprised of a first outer relatively hard shell and an inner porous body core that is formed from a plastic composition and a blowing agent to give the entire lure the characteristics of a light, low density, highly buoyant body.

Other objects and advantages of the present invention will become apparent from a study of the following description and the accompanying drawings which are merely illustrative of the present invention.

ARTIFICIAL FISHING LURE WITH WEEDLESS RETRACTABLE HOOKS

Figure 1:
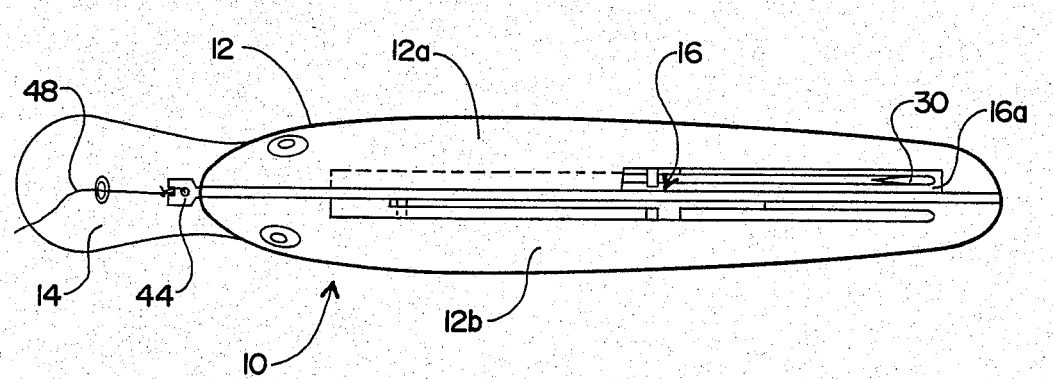
FIG. 1 is a top plan view of the artificial fishing lure of the present invention.

With further reference to the drawings, the artificial fishing lure of the present invention is shown therein and indicated generally by the numeral 10. Viewing artificial fishing lure 10 in more detail, it is seen that the same includes a main body structure 12 that is preferably formed by a plastic injection molding process. In such a process, the main body structure 12 includes a pair of body halves 12a and 12b with the body halves secured together to form a main body structure of the lure. Secured to the front of the body structure 12 and extending forwardly therefrom is a spoon 14 that includes an eyelet for receiving an attached fishing line 48.

One particular half of the main body structure 12 of the lure includes a series of transverse connecting pins 18, 20, 22, 24, and 26. These pins extend transversely from one half of the body main structure and are adapted to be received by corresponding aligned and spaced pin openings formed in the other half of the main body structure. Consequently as assembled, the respective pins 18, 20, 22, 24, and 26 extend into respective pin openings of the other body half so as to form the complete body structure of the artificial fishing lure 10.

Artificial fishing lure 10 of the present invention is designed to be provided with so called weedless hooks. In the case of the present invention, the weedless hooks are specifically designed to normally assume an inoperable, nonactuated, or retracted position inside of the main body structure 12 of the lure. Further, artificial fishing lure 10 of the present invention is designed such that once a predetermined tension is created between the fishing lure 10 and the fishing line 48 leading therefrom, the hooks in response to this tensioning, move from said retracted position to an exposed hooking position such that the hooks can engage and hook an attacking fish.

To accommodate the mechanisms required for actuating these hooks, the main body structure of the artificial fishing lure 10 includes an internal cavity, generally indicated by the numeral 16. Cavity 16 is preferably formed by each body half 12a and 12b being provided with an indention formed in a side portion thereof. The respective indentions align and cooperate to form cavity 16.

Figure 3:
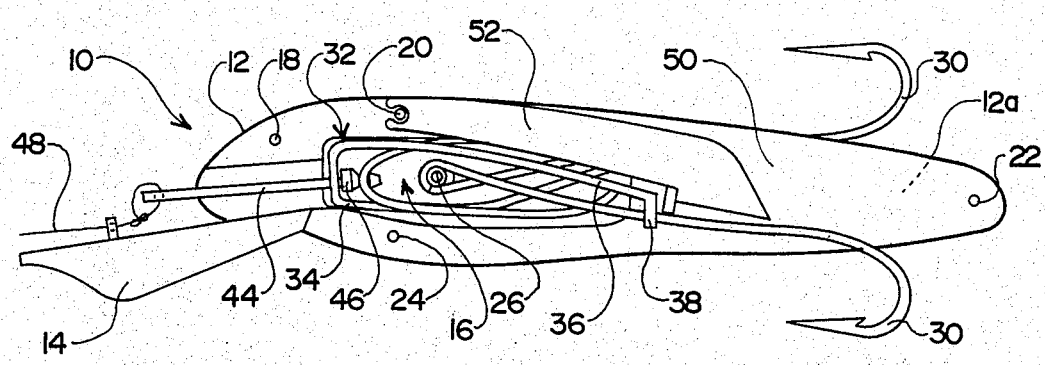
FIG. 3 is a side elevational view similar to that shown in FIG. 2 with the hooks being moved to a second or exposed hooking position where they lie outwardly of the lure's body.

Cavity 16 is communicatively connected to a pair of hook openings 16a. One hook opening is formed about the upper rear edge of the fishing lure 10, as seen in FIG. 1, and the other hook opening is formed about the opposite underside. As will be appreciated from subsequent portions of this disclosure, the actuation of the hooks results in the respective hooks being moved through these hook openings 16a to an exposed hooking position such as shown in FIG. 3.

Turning now to a discussion of the internal hook actuating mechanism and hooks of the present invention, it is seen that the artificial fishing lure 10 of the present invention includes a pair of laterally spaced hooks 30. In the embodiment disclosed herein, each hook includes an eyelet that is pivotably secured about transverse pin 26. Consequently the respective hooks 30 can pivot about the axis of this pin.

Figure 2:
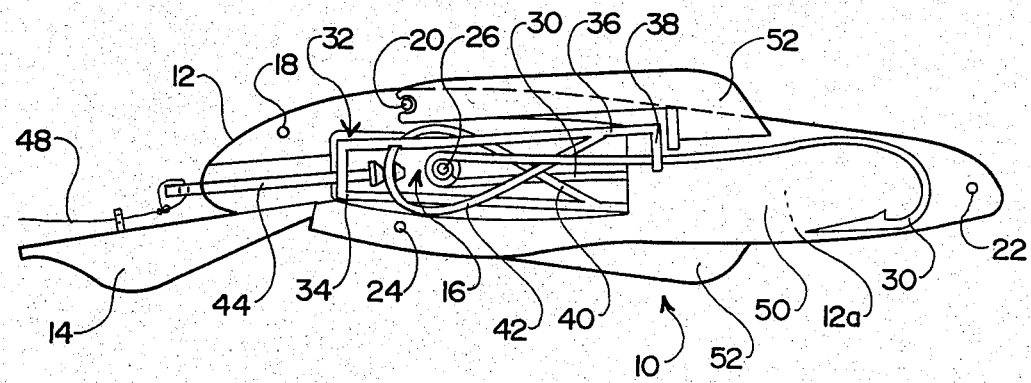
FIG. 2 is a side elevational view of the present invention with one side removed and with the hooks of the lure being disposed in a first retracted position internally within the lure's body structure.

Operatively connected to the hooks 30 is a hook actuating bow assembly, indicated generally by the numeral 32. In the case of the present disclosure, hook actuating bow assembly 32 comprises a molded plastic member. Viewing hook actuating bow assembly 32 in more detail, it is seen that the same includes a forward head portion 34 that includes an opening therein (not shown). A pair of flexible bow arms 36 extends generally rearwardly from head 34, as oriented within the fishing lure 10 as shown in FIGS. 1 through 3. Each bow arm 36 includes a hook receiver 38 that includes an opening that allows the shank of a respective hook to extend therethrough. Although not particularly shown, the eyelet of each hook 30 is especially designed to include an opening adjacent the shank such that it can be easily threaded into the opening of the hook receiver 38.

Figure 4:
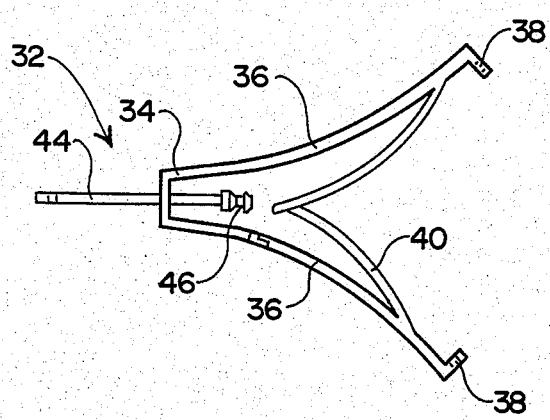
FIG. 4 is a side elevational view of the hook actuating bow assembly of the present invention prior to the string of said bow assembly being formed into a loop and connected to an arrow of the bow assembly.

Interconnected between bow arms 36 is a string 40. String 40, as illustrated in FIG. 4, is twisted to form a loop portion 42. Loop portion 42 is connected to an arrow 44 that includes a loop catch 46 that is adapted to receive a portion of loop 42. Arrow 44 is confined within an opening (not shown) formed in head 34 of bow assembly 32.

Figure 5:
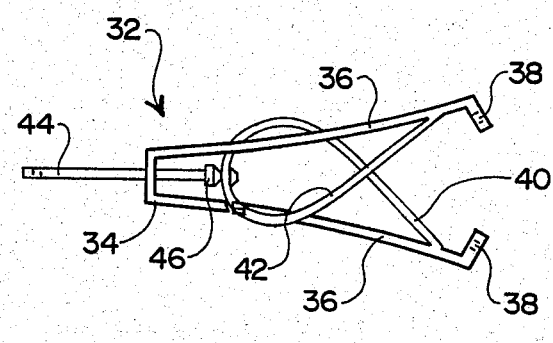
FIG. 5 is a side elevational view of the hook actuating bow assembly shown disposed in a relaxed, nonactuated position.
Figure 6:
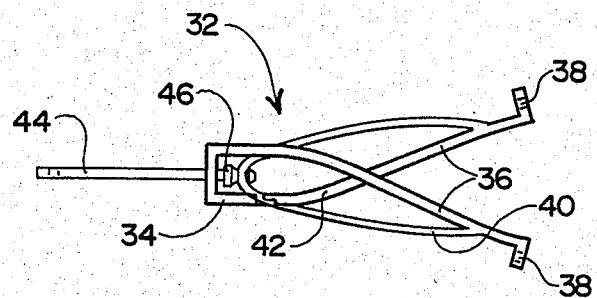
FIG. 6 is a side elevational view of the hook actuating bow assembly of the present invention with the same being disposed in an extended hook exposed position.

Arms 36 are laterally off set with respect to each other such that they may move from a relaxed position (FIG. 5) to an extended or cross position (FIG. 6). In addition about each arm 36 adjacent head 34, there is provided a slot-like opening for loosely receiving the loop portion 42 of string 40. This slot-like opening is formed about the inside edge of the respective arms 36. This confines loop portion 42 about the bow assembly 32.

Arrow 44 of bow assembly 32 is in turn operatively attached to fishing line 48 that extends from artificial fishing lure 10 and which is ultimately connected to a fishing instrument such as a spinning casting assembly.

Interposed between the pair of hooks 30 within lure 10 is a divider panel 50. As seen in the drawings, divider panel 50 generally separates and lies between hooks 30 and prevents the hooks from interfering and engaging each other when the hooks of the lure are actuated. As shown in the drawings, divider panel 50 is supported within the fishing lure by a series of the outside transverse pins 18, 20, 22 and 24.

In addition, artificial fishing lure 10 of the present invention is provided with a pair of pivotably mounted fins 52 which are independent of hooks 30 and the hook actuating bow assembly 32. In particular the present design suggests the provision of an upper fin pivotably mounted about transverse pin 20 and a lower fin pivotably mounted about transverse pin 24. Fins 52 normally extend outwardly from the main body structure 12 of the lure and normally assume an exposed position outwardly of the lure's main body. Although the fins are independent, they align with and generally rest adjacent respective hooks 30. An attacking fish that engages one or both fins 52 will cause the same to pivot inwardly towards the main body structure of the lure 10. In the process the inward edge or side of the respective fins will engage a respective hook 30 aligned therewith and cause the same to move toward the opposite side of the lure's main body 12 into an exposed hooking position. Consequently, this aids in hooking an attacking fish. As will be clearly understood from a subsequent description of the operation of the present invention, because the hooks are biased towards the retracted position, as shown in FIG. 2, movement of the hooks back to such position will naturally result as fins 52 move back to their outer exposed positions, as also shown in FIG. 2. Fins 52 extend through fin openings provided about the upper and lower edges of said lure's body structure 12, and these fin openings are communicatively connected with the main internal cavity 16 that houses said hooks 30 and hook actuating bow assembly 32. In addition, fins 52 includes a stop that is designed to effectively engage part of the lure's body structure that prevents the same from moving outwardly from said lure any more than that shown in FIG. 2.

Turning now to the description of the operation of said actuating bow assembly 32, it is appreciated that the grasping of fishing lure 10 by a fish will result in a certain amount of tension being applied to fishing line 48. Once a certain amount of tension has been applied, arrow 44 will move forwardly within bow assembly 32 from a relaxed position, as shown in FIG. 2, to an extended position as shown in FIG. 3. The forward movement of arrow 44 results in loop 42 being pulled forwardly also. The forward movement of loop 42 results in the resilient arms 36 being moved inwardly toward each other and this results in the arms actually crossing, as illustrated in FIG. 6. It should be noted that the arms 36 are laterally off set in order to accomplish this with respect to head 34. The crossing of arms 36 results in hooks 30 being restrained to move from their retracted position of FIG. 2 to the exposed hooking positions of FIG. 3. It is seen that as arms 36 move inwardly to a cross position that the shank of the respective hooks 30 are allowed to move inwardly within hook receivers 38 formed about the remote end of arms 36.

Once the tension is released from fishing line 48, because of the resilient nature of arm 36, they move back to their normal relaxed position, as shown in FIGS. 2 and 5. In this relaxed position, the respective hooks 30 are constrained to assume the retracted position as shown in FIG. 2.

Finally turning to a discussion of the body structure 12 of lure 10, it is seen that the respective body halves 12a and 12b are of a generally solid structure. As indicated hereinbefore, the body halves are formed by an injection plastic molding process. In the course of the process, there is formed a relatively hard outer shell. Instead of making the lure in a hollow body design as with conventional lures, the present lure includes an inner solid plastic porous type body core that extends inwardly from the outer hard shell. To form the solid porous inner body core a plastic composition is mixed with a blowing agent during the molding process and the combined composition is injected into the mold at a volumetric rate that allows the total composition to expand to the extent of forming a solid but porous plastic inner core that is of a relatively lightweight and low density and which includes a relatively high level of buoyancy.

Because of the presence of cavity 16, this structure and the particular structural composition of the body 12 enables the lure of the present invention to float and to maintain a high level of buoyancy as it is pulled through the water.

From the foregoing specification, it is appreciated that the present invention presents a very useful and unique artificial fishing lure with retractable weedless hooks. In particular the design of the molded plastic hook actuating bow assembly enables a very efficient and reliable actuating mechanism to be provided at a minimum cost. In addition the design of the molded hook actuating bow assembly overcomes the disadvantages that would be found with a conventional metal type mechanism having numerous parts.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An artificial fishing lure comprising in combination:
   (a) a lure body structure having a cavity formed therein and hook openings formed about outer portion of said body and communicatively connected to said cavity;
   (b) a pair of laterally spaced hooks pivotably mounted about a transverse axis within said lure body structure and movable between a normal retracted position within said lure and an exposed hooking position where said hooks extend outwardly through said hook openings, each hook including an end eyelet, a shank portion, and a hook end;
   (c) a hook actuating one piece molded plastic bow assembly mounted and confined within said cavity and including a generally U-shaped plastic head and a pair of flexible plastic bow arms integrally formed with said head and extending therefrom and normally disposed in a relaxed position and wherein each bow arm includes a hook receiving opening formed thereon to receive the shank portion of said hooks, and wherein said bow arms are off set with respect to each other and move in separate planes such that said bow arms cross as said hooks are moved from said retracted position to said exposed hooking position;
   (d) said one piece molded plastic bow further including a plastic string integrally formed with and interconnected between said bow arms and twisted to form a plastic loop portion, and slot-like openings formed on said bow arms for receiving said formed loop portion and confining the same about molded plastic bow assembly;

(e) an arrow operatively associated with said molded plastic bow and movably mounted for fore-and-aft movement within the head of molded plastic bow assembly, said arrow further including connecting means for connecting the same to said formed loop rearwardly of said head such that during the fore stroke of said arrow said formed loop is moved forwardly causing said plastic bow arms to move inwardly towards each other so as to cause said hooks to pivot about said transverse axis and to move from said retracted position to said exposed hooking position, wherein on said aft stroke, said formed plastic loop moves rearwardly as said bow arms, due to their resiliency and flexibility, flex back to said relaxed position and in so doing causes said hooks to pivot back to said retracted position; and (f) wherein said arrow is adapted to be operatively connected to a fishing line and operatively associated with said bow assembly to move fore-and-aftly and to actuate said bow assembly in response to a predetermined amount of tension being placed on said fishing line by a fish biting and grasping said artificial lure.

2. The artificial lure of claim 1 wherein said fishing lure includes a pair of fins independent of said bow assembly and wherein each fin is pivotably mounted on a transverse axis within said lure body, each fin being movable between an exposed position outwardly of the lure's body to a inward position inside of said lure body and wherein each fin is aligned with a respective hook and engageable therewith such that the movement of a respective fin from said exposed position to a said inward position results in the movement of the adjacent hook from a retracted position to an exposed position opposite the former exposed position of said fin.

3. The artificial fishing lure of claim 2 wherein said fishing lure body is open due to said cavity and wherein the same is made buoyant by providing a porous type inner body core that extends from said cavity outwardly to the outer surface of said lure so as to generally provide a solid fishing lure body that has substantial cross sectional area.

4. The artifical fishing lure of claim 3 wherein said artificial lure includes a hook divider panel secured within the body structure of said lure and disposed between said hooks for preventing said hooks from interfering with each other when said hooks are moved between said retracted position and exposed hooking positions.

* * * * *